Sept. 28, 1971   L. H. LEONARD, JR   3,608,327
ABSORPTION REFRIGERATION SYSTEM
Filed March 18, 1970
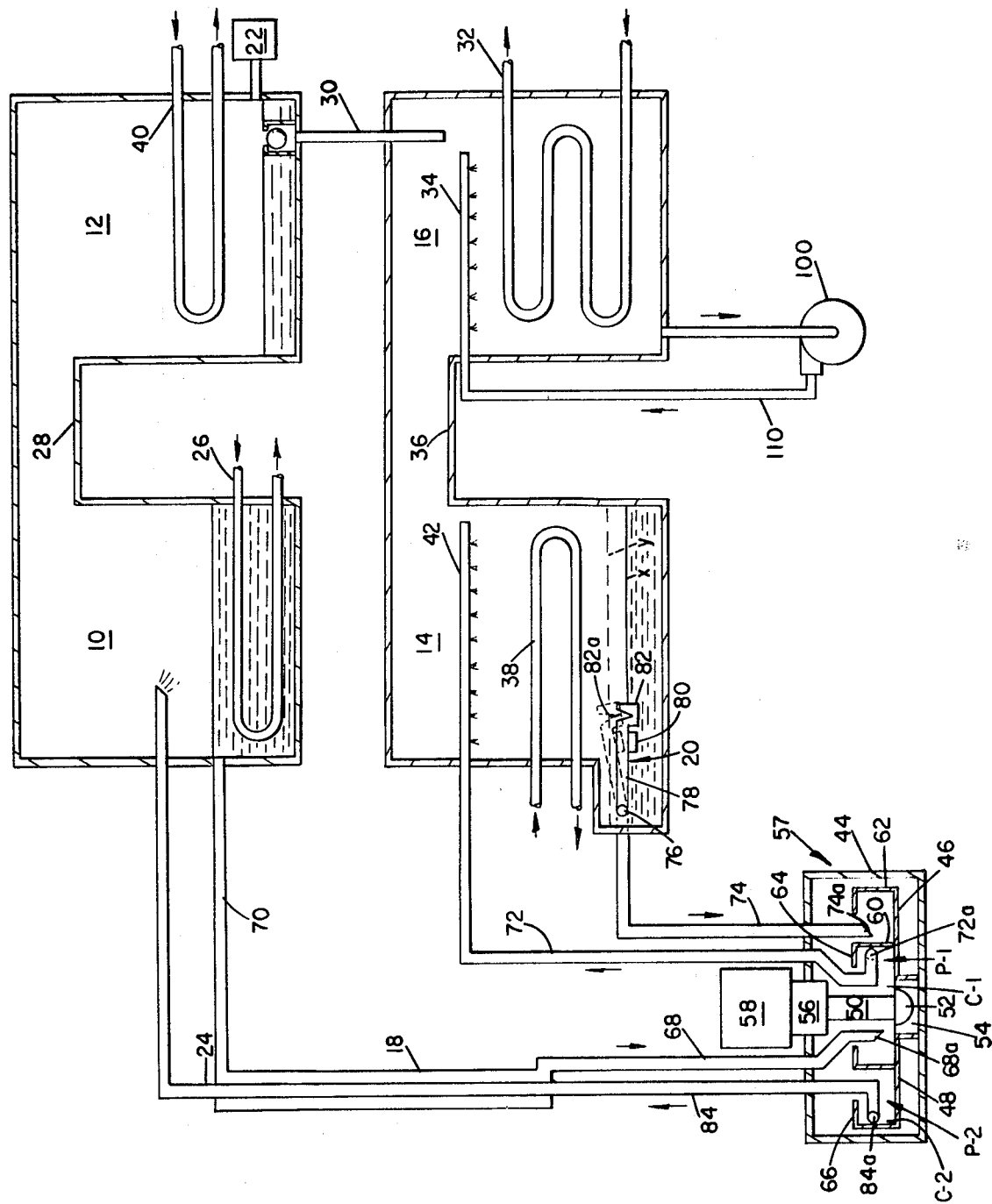
INVENTOR.
LOUIS H. LEONARD, JR.
BY
*Frank N. Decker Jr.*
ATTORNEY

United States Patent Office 3,608,327
Patented Sept. 28, 1971

3,608,327
ABSORPTION REFRIGERATION SYSTEM
Louis H. Leonard, Jr., De Witt, N.Y., assignor to
Carrier Corporation, Syracuse, N.Y.
Filed Mar. 18, 1970, Ser. No. 20,774
Int. Cl. F25b 15/06
U.S. Cl. 62—141
5 Claims

ABSTRACT OF THE DISCLOSURE

An absorption refrigeration system wherein there is provided fluid transfer apparatus preferably taking the form of a stationary housing mounting therein a plurality of pump means desirably of the scoop type for circulating absorbent solution through the system. The pump means communicates with the absorber and has in association therewith fluid flow control means located in the absorber and responsive to changes in the liquid level and density in the absorber to vary the volume of solution flowing to the pump, thereby controlling the volume of solution transferred to the generator for reconcentration under varying machine conditions.

BACKGROUND OF THE INVENTION

This invention relates to absorption refrigeration systems. It is customary to employ centrifugal pumps to circulate absorbent solution from the absorber to the generator and to circulate relatively cold refrigerant over a heat exchanger in an evaporator. However, centrifugal pumps require that a positive head exist in order to force the liquid into the impeller eye without flashing and vapor binding. Accordingly, it has been proposed to circulate refrigerant and absorbent solution in an absorption refrigeration system by using one or more scoop pumps generally taking the form of a closed chamber within which is rotatably mounted a peripherally flanged disc for centrifugally impelling at a high tangential velocity liquid directed into the chamber through an inlet conduit, the liquid which is thus flung outwardly being picked up by a scoop or eduction tube. Scoop pumps have among their advantages simplicity of construction and in normal operation are essentially completely self-balancing and generally will not cavitate significantly even though a relatively small quantity of fluid is fed to them. Further, scoop pumps have other advantages, such as a low suction head requirement, the ability to pump mixtures of noncondensables and liquids, and can be run with no liquid therein if required, without deleterious results.

Scoop pumps do, however, possess an inherent disadvantage in that liquid cannot be stored above them. Essentially, all of the liquid which flows into the scoop pumps from the generator and absorber, as would occur upon a machine shutdown, must be transferred into the system when machine operation is resumed. This requires a significant amount of power to pump the solution until the housing is emptied. Further, in an absorption refrigeration system, the volumes of solution therein necessarily vary due to changes in machine operating conditions. Under part load, the control system reduces the heat input to the generator and decreases the concentration of the strong solution supplied to the absorber. Since the solution has more refrigerant in it, the solution level in the absorber is accordingly raised. An increased volume of solution in the absorber is undesirable if it is allowed to flood the scoop pump housing, because it increases the drag on the rotating scoop pump pan.

Furthermore, it is desirable to increase solution flow to the generator at high refrigeration loads and to reduce the solution flow at part load or low ambient temperature so that the volume of solution heated by the generator is minimized and the operating economy improved at part load. However, this ordinarily requires a separate control system with special valves in order to achieve the desired flow control.

SUMMARY OF THE INVENTION

In accordance with this invention, there is provided an absorption refrigeration machine having a generator, a condenser, an evaporator, an absorber, and fluid transfer apparatus comprising a scoop pump. The scoop pump includes a channel-shaped rotatable pan having a discharge nozzle therein forming a part of conduit means leading from the absorber for passing weak absorbent solution to the pan which is centrifugally impelled therein and picked up by an eduction orifice for transfer to the generator. The conduit which transfers relatively weak solution from the absorber has connected thereto a solution flow control device. This device preferably takes the form of a relatively short length tubular member connected to the absorber conduit by a swivel joint. The tubular member mounts float means disposed in an absorber sump and may also embody a V-notch weir-type flow metering member.

By provision, in combination with a scoop pump, of solution flow control means of the character described, a number of important advantages result. First, the flow control device effectively controls solution flow and thereby prevents overloading of the scoop pump with an excess volume of solution. Another advantage is that the flow control device skims from the top of the solution in the absorber any alcohol which floats thereon and provides means for continuous recirculation of the alcohol. Still another advantage, which is associated with the use of a weir-type flow metering member, is that solution can be accurately metered to the generator in response to different solution levels and thereby provides a means for machine capacity control. In particular, as the load or ambient temperature decrease, the weak solution becomes more dilute. Under these conditions, the float means causes the weir to ride higher in the solution level to reduce effective area of the inlet opening and reduce the solution flow to the generator which results in improved operating economy.

Thus, there is provided a simple capacity control which utilizes the unique capability of the scoop pump to function without a head of solution, while at the same time avoids the major shortcoming of the scoop pump, its inability to function efficiently when flooded with liquid.

BRIEF DESCRIPTION OF THE DRAWING

The single view is a schematic flow diagram, partially in cross section, of an absorption refrigeration system embodying this invention.

DESCRIPTION OF THE PREFERRED EMBODIMENT

In accordance with a preferred embodiment of this invention, there is provided an absorption refrigeration system which utilizes water as a refrigerant and an aqueous solution of lithium bromide as an absorbent. A suitable compound, such as octyl alcohol (2-ethyl-n-hexanol), may be added to the solution for heat transfer promotion, and suitable corrosion inhibitors also may be used. "Strong solution" as referred to herein is concentrated solution of lithium bromide, which is strong in absorbing power, and "weak solution" is a dilute solution of lithium bromide, which is weak in absorbing power.

Referring now to the drawing, there is shown an absorption refrigeration system comprised of a generator 10, a refrigerant condenser 12, an absorber 14, an evaporator 16, a solution heat exchanger 18, and fluid transfer apparatus 57, which includes a solution flow control means 20. A purge unit 22 may be employed to remove relatively noncondensable vapors from the system. Refrigerant circulation apparatus 100 is provided to circulate refrigerant in evaporator 16.

Generator 10 comprises a boiler to which weak absorbent solution is directed from heat exchanger 18 through conduit means 24. The solution is boiled in the generator by a heat source such as steam pipe 26 to concentrate the absorbent solution by vaporizing refrigerant therefrom. The refrigerant vapor passes into condenser 12 through passage 28. Other types of well-known boilers or generators employing a combustible gas may be utilized.

Water vapor boiled off from the weak solution in generator 10 is condensed in condenser 12 and the condensate is directed by conduit 30 to evaporator 16. A heat exchanger 32, through which a heat transfer medium to be cooled flows, is located in the evaporator. A spray header 34 is also disposed in the evaporator to wet the surfaces of the heat exchanger 32 with liquid refrigerant circulated from the evaporator. Refrigerant in evaporator 16 is evaporated to cool the heat exchange medium passing through heat exchanger 32 and the resulting water vapor passes through passage 36 to absorber 14.

Absorbent solution in absorber 14 absorbs water vapor from evaporator 16. Heat exchangers 38 and 40 are connected to a source of cooling medium, such as water, to remove waste heat from the refrigeration cycle. Also located in the absorber 14 is spray header 42 which serves to wet the surfaces of heat exchanger 38 with strong absorbent solution.

Fluid transfer apparatus 57 preferably comprises a stationary hermetic housing 44 mounting therewithin a pair of scoop pumps P-1 and P-2 provided in part by a compartmented rotatable pan 46 connected along its base portion 48 to shaft means 50 journaled at one end in bearing means 52, which may be of spherical configuration, seated in bearing support means 54. The opposite end of shaft 50 is journaled in bearing means 56, desirably of the magnetically centering type, and is rotatively driven by motor means 58. The rotatable pan 46, in addition to its base portion 48, is defined by a pair of upstanding coaxial annular wall portions 60 and 62 from which extend radially inwardly directed upper wall portions 64 and 66 respectively to form channel-shaped pans which define a pair of absorbent solution circulation chambers C-1 and C-2.

Disposed within the chamber C-1 is discharge nozzle 68a of discharge conduit 68 which communicates with solution heat exchanger 18, and receives strong solution from generator 10 through passage 70 to feed to the chamber C-1. The solution is centrifugally impelled within the chamber C-1 by pan rotation and is pumped therefrom through eduction orifice 72a of eduction conduit 72 and passes to spray header 42 in absorber 14.

Absorbent solution circulation chamber C-2 has located therein discharge nozzle 74a of discharge conduit 74. The opposite end of conduit 74 has a swivel or pivot joint 76 connected to tubular member 78 of solution flow control means 20 located in a solution sump associated with absorber 14. The tubular member 78 carries, preferably on its lower surface, float means 80 which may be made of suitable foamed plastic. Float means 80 is spaced from pivot joint 76 and open end 82 of tube 76. The solution flow control means 20 preferably incorporates means for accurately metering solution from the absorber to the generator and, in effect, thereby provides a measure of machine capacity control. This means may take many forms, and a preferred structure is weir-type flow metering means 82 formed generally centrally of its length with a V-shaped notch or cavity 82a. Float 80 is so spaced on flow control means so that a rise in solution level in the absorber sump lifts opening 82c out of the solution to reduce the quantity of solution which is pumped to generator 10.

Fluid transfer apparatus 57 further includes eduction conduit means 84 terminating at one end in eduction orifice 84a disposed in solution circulation chamber C-2 for passing centrifugally impelled solution introduced into this chamber from absorber 14 through solution heat exchanger 18 in counterflow relation with strong solution transferred from the generator 70 through conduit 68. The weak relatively cool solution is then discharged into the generator 10 through conduit 24 to be reconcentrated in the generator. A drain or additional scoop (not shown) may be provided for removing any liquid which accumulates in the bottom of housing 44. Pump means, such as a centrifugal or scoop pump 100 in passage 110 is provided for circulating liquid refrigerant from and to the evaporator 16 through spray header 34.

During full load operation of the machine, the solution level within the sump of absorber 14 is at a level denoted by the legend $x$ and the flow control means 20 is at essentially its maximum downward position as shown in full line. When so positioned, the effective area of the V-notched weir 82 immersed in the solution is large. Consequently a large volume of solution sufficient to meet machine requirements at the full load setting is passed to pump 57. This solution is discharged from nozzle 74a into chamber C-2 and is centrifugally impelled therein by rotation of pan 46, and is picked up by eduction orifice 84 to be pumped to the generator 10 for reconcentration therein. Alcohol floating on the solution in the absorber is skimmed therefrom by the suction line and recirculated through the system, avoiding the necessity for such expedients as a warm solution line immersed in the solution to evaporate the alcohol therefrom.

The weir-type metering member 82 performs an effective metering function responsive to varying solution levels in the absorber sump. When the weak solution is at the relatively high level $y$, as might be occasioned by relatively low load or ambient temperature conditions, the optimized solution flow from the weir member 82 through the tubular member 78 is below the design flow desired when the solution level is at level $x$. At high solution levels, float 80 will lift the V-notch 82 partially out of the solution as shown in broken lines and will reduce the flow of solution to pump 57 and generator 10 by reducing the effective inlet area of weir 82 immersed in the solution. Conversely, with the solution level at $x$ and the control device 20 in its lower position, as shown in full line, as would occur at relatively high load or ambient conditions, the solution flow to pump 57 and generator 10 would be at essentially its maximum.

It can be seen that by provision of a weir member of the type described, the solution flow through the system is varied automatically as the solution storage level in the absorber changes and thereby providing desirable part load efficiency by automatically reducing solution flow to the generator.

In addition to the foregoing advantages, the solution flow control means 20 of this invention assures that flooding or overloading of a scoop pump is prevented at any solution level and the power required to drive the pump is thereby reduced.

It will be seen that the unique combination of the floating weir and scoop pump unexpectedly complement each other because the weir prevents flooding of the scoop pump, which would reduce the pump efficiency, while the scoop pump permits use of a floating solution flow control because of the scoop pump's ability to function without a suction head and with starved solution flow. This, in turn, allows throttling of solution flow to the generator automatically at part load which improves part load efficiency. At the same time, the problem of maintaining the alcohol in circulation in the system is overcome by skimming it from the solution surface.

Various changes and modifications may, of course, be effected in the structures disclosed without departing from the scope of the invention or the scope of the subjoined claims.

I claim:
1. An absorption refrigeration system comprising a generator for boiling absorbent solution to concentrate the solution by vaporizing refrigerant therefrom; a condenser for condensing refrigerant vapor formed in the generator; an evaporator for evaporating refrigerant condensed in the condenser to provide refrigeration; an absorber for absorbing refrigerant vapor formed in the evaporator into an absorbent solution concentrated in the generator, said absorber having an absorbent solution sump associated therewith for storing absorbent solution; weak solution passage means for passing weak absorbent solution from the absorbent sump to the generator; a scoop pump disposed in said weak solution passage means for pumping weak absorbent solution from said absorber sump through said weak solution passage means to said generator; and float operated solution flow control means responsive to the level of absorbent solution in said absorber sump for controlling the volume of the absorbent solution passing through said weak solution passage from said absorber sump to said scoop pump.

2. An absorption refrigeration system as defined in claim 1 wherein said float operated solution flow control means includes a floating inlet passage means in said absorber sump for skimming liquid from the surface of solution in said sump and passing the liquid to said scoop pump through said weak solution passage means.

3. An absorption refrigeration system as defined in claim 1 wherein said float operated solution flow control means includes means for providing less solution flow from said absorbent solution sump to said scoop pump when the level of solution in said sump is relatively high than when the level of solution in said sump is relatively low.

4. An absorption refrigeration system as defined in claim 1 wherein said float operated solution flow control means includes a floating weir having an opening notch therein of varying transverse size, said float means being spaced from said weir and disposed with respect thereto so that the effective area of the opening notch of said weir immersed below the surface of the solution in said sump is less upon the presence of a relatively high level of solution in said sump than when the level of solution in said sump is relatively low.

5. An absorption refrigeration system as defined in claim 1 wherein said float operated solution flow control means includes a floating tubular member having an inlet opening disposed at the surface of absorbent solution in said sump for receiving absorbent solution from adjacent the surface thereof, and float means connected with said tubular member and disposed in spaced relation with said inlet opening, said float means being arranged with respect to said inlet opening to vary the effective area of the inlet opening submerged in and receiving absorbent solution from said sump in accordance with the level of solution in said absorbent sump.

References Cited

UNITED STATES PATENTS

| 2,184,992 | 12/1939 | Coons | 415—89X |
| 3,158,008 | 11/1964 | Aronson | 62—476 |
| 3,279,203 | 10/1966 | Leonard, Jr. | 62—141X |
| 3,426,547 | 2/1969 | Foster | 62—141X |

WILLIAM F. O'DEA, Primary Examiner

P. D. FERGUSON, Assistant Examiner

U.S. Cl. X.R.

62—476; 415—88, 89